(12) United States Patent
Heath et al.

(10) Patent No.: US 6,564,274 B1
(45) Date of Patent: May 13, 2003

(54) MODULAR ARCHITECTURE FOR SMALL COMPUTER NETWORKS

(75) Inventors: Chester A. Heath, Chapel Hill, NC (US); Dennis J. McBride, Wake Forest, NC (US); Gregg J. McKnight, Chapel Hill, NC (US); Vincent C. Wu, Apex, NC (US)

(73) Assignee: Omnicluster Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/466,463

(22) Filed: Dec. 17, 1999

(51) Int. Cl.$^7$ .............................................. G06F 13/42
(52) U.S. Cl. .................... 710/105; 710/11; 710/301; 333/236; 333/243; 709/244
(58) Field of Search .................... 710/105; 709/219, 709/230; 348/14, 15, 17; 370/85.6; 380/49; 395/425, 474; 333/236, 243, 245

(56) References Cited

U.S. PATENT DOCUMENTS

| | | | | |
|---|---|---|---|---|
| 4,639,864 A | * | 1/1987 | Katzman et al. ............. 713/340 |
| 5,067,071 A | * | 11/1991 | Schanin et al. .............. 395/275 |
| 5,239,643 A | * | 8/1993 | Blount et al. ................ 395/425 |
| 5,381,413 A | * | 1/1995 | Tobagi et al. ............... 370/85.6 |
| 5,765,036 A | * | 6/1998 | Lim ........................... 395/474 |
| 5,927,050 A | * | 7/1999 | Houck et al. .................. 53/428 |
| 6,011,579 A | * | 6/2000 | Newlin ........................ 348/15 |
| 6,075,863 A | * | 6/2000 | Krishnan et al. ............. 380/49 |
| 6,085,273 A | * | 7/2000 | Ball et al. ................... 710/129 |
| 6,289,376 B1 | * | 9/2001 | Taylor et al. ................ 709/219 |

OTHER PUBLICATIONS

Robert G. winch, Telecommunication Transmission Systems 1993, McGraw–Hill, 1$^{st}$ edition, p487–p500.*

* cited by examiner

*Primary Examiner*—Sumati Lefkowitz
*Assistant Examiner*—Christopher E. Lee
(74) *Attorney, Agent, or Firm*—Kaplan & Gilman, LLP (57) ABSTRACT

In concentrated multiprocessor systems conforming to the presently disclosed modular architecture, a host processor and plural client processors are packaged in a single box containing a high speed (short length) bus connecting all of the processors, and data storage resources via the bus. The bus may be of a type commonly used in contemporary single computer systems; e.g. one conforming to PCI specifications. The host processor and associated resources are mounted directly on an integrated circuit motherboard containing the bus and card connectors attached to the bus. The card connectors removably receive integrated circuit cards containing individual client processors. In one embodiment, client processors are configured to be used as workstations or PC's—in a residence, office or small factory environment—relative to users and accessories remote from the system enclosure. In another embodiment, host and client processors are configured to operate as servers between the system and multiple data networks external to the system; the host and client subsystems thereby constituting a server "farm".

23 Claims, 7 Drawing Sheets

| Config. | Processor | Function |
|---|---|---|
| Home/Office computing | Host | Network server relative to cards; also may be used directly by individual users. |
| | Card 1 | Personal computer (pc) for user site remote from system via input device and monitor linked to card through broadband cable; uses programs stored on system board and progeam files stored in file cache on system board. |
| | Card 2 | Same as card 1; serving other remote user(s). |
| Server "farm" | Host | Server relative to external network A |
| | Card 1 | Server relative to external network B |
| | Card 2 | Server relative to external network C |

FIG. 12

System Board DASD
[holds complete programs and data for host and client systems] — 190

System Board RAM
[shared by host and client systems; includes file caches for clients] — 195

MODULAR ARCHITECTURE FOR SMALL COMPUTER NETWORKS

CROSS-REFERENCES TO RELATED APPLICATIONS

Application Ser. No. 09/465,675 by R. Callender et al, filed at the same time as the present application and titled PEER NETWORKING IN CONCENTRATED COMPUTER CLUSTERS, describes a computer system conforming to the modular architecture described in the present application which uses network communication protocols on a bus connecting a group of computers housed within a small enclosure/box.

DEFINITIONS

Modular Network: As used herein, connotes a concentrated set of cooperating computers; typically, a set housed within a small box, and having modular form and functionality. The modular form allows for simple addition of computers to or replacement of computers in the set. Modular functionality allows for such computers to be designed for different functions despite their interchangeability (e.g. for one computer to function most efficiently as a personal computer and another computer to function most effectively as a network server). Such networks are further characterized in that they exhibit some or all of the following attributes: a) they contain a host computer and several client computers; b) the host computer, storage resources shared by it and the client computers, and a system bus linking the computers, are mounted on an integrated circuit board or substrate; c) the client computers are contained on cards which plug into sockets extending from the board/substrate; d) due to its short length, the system bus can be operated at a speed sufficient to allow for efficient operation of the client computers using data and programs accessible to these computers primarily through that bus; e) operation of the host computer subsystem as a network server relative to a network external to the respective set; f) operation of the client computer cards as both masters and slaves of the system bus; and g) operation of the system bus with a plurality of different signaling protocols, including a network signaling protocol by means of which the host and client computers are linked into a data communication network confined to the bus and its connections, this network serving to allow the client computers to exchange large data packets (e.g. packets larger than the amount of data transferrable on the bus in a single cycle of bus operation) both with each other, as peers, and with the host subsystem as clients of that subsystem. Typically, a modular network of this kind would be located in a small amount of space within a residence, office or factory, and have external connections from the host and client computers to equipment serving local users within a limited range; e.g. up to 200 yards from the box housing the respective network.

BACKGROUND OF THE INVENTION

Contemporary local area networks (LAN's), wherein separately housed computers are linked for communication within the confines of a single residence or office, tend to be both inefficient and uneconomical. For instance, "stand-alone" personal computers in b; such environments individually contain memory, storage and other resources, that are either unused or infrequently used, that are rarely if ever shared by the other computers, and that are unlikely to ever be used to full capacity before the system needs to be discarded or replaced as "obsolete". Since the cost of each computer in such networks effectively includes costs of such unused resources, as well as a portion of the cost of setting up their network connections, that cost is considerably more than it would need to be if the infrastructure for such a network could be assembled as a single article of manufacture, with all resources and network connections fully integrated into the assembly.

The present invention provides a modular architecture for such networks that overcomes or avoids the foregoing disadvantages associated with operation of "overly equipped" computer systems in comparable LAN's containing stand-alone computers.

SUMMARY OF THE INVENTION

A modular computer system architecture conforming to this invention includes a host computer and one or more client computers having at least two of the following attributes: 1) the system is concentrated into a small space; typically within the confines of a small box comparable in size to the housing of a contemporary stand-alone personal computer; 2) the client computers share real-time access to storage and other resources managed by the host computer through a high speed system bus connecting all of the computers in the system; 3) the host computer and resources it manages are mounted on a common integrated circuit substrate; and the client computers are embodied in integrated circuit cards which plug into sockets extending from that substrate; 4) at least one of the client computer cards is "diskless" (i.e. it does not contain a disk drive), and otherwise lacks immediately accessible storage resources, so that the amount of data which it can instantaneously store is a very small fraction of the aggregate amount of data which it must process in real time in order to perform its requisite functions; 5) storage resources managed by the host system include a hierarchy of disk drives and RAM memory, characterized in that information in RAM memory is accessible in a fraction of the time it would take to obtain access to the same information in a disk drive; 6) a portion of the just-mentioned RAM memory is configured to serve as a file cache shared by the client computers; 7) although the client computer cards may have different constructions, they all contain a Modular Network Interface Chip (MNIC) having what is presently considered unique construction and functions, serving to provide uniform connectivity between the other components of the respective card and the system bus; 8) the system bus is operated in several different signaling modes, in one of which the system of host and client computers operates as a self-contained packet routing network enabling the client computers to exchange information packets with each other and/or with the host computer, and in which packets so handled can be orders of magnitude larger than the amount of information which is transferable in a single cycle of bus operation; 9) the system can be connected to networks external to it, but use network signaling processes different from their internal network protocol relative to such external networks; 10) one or more of the client cards has connections external to the system to broadband media (e.g. coaxial cable) enabling respective cards to connect to devices serving remote users (for example, to keyboard, monitor and cursor positioning devices), whereby each such card is potentially capable of serving as an intelligent personal computer in relation to respective remote users, and wherein lengths of such external media can be orders of magnitude greater than the length of the system bus (with the advantage that the speed of communication on the system bus can be used to enable the cards to efficiently share system resources and the lower yet adequate speed of communication over the broadband media can be used to efficiently service the remote users); 11) the client card(s) may contain buffer RAM storage of predetermined minimal capacity, related functionally to the rate of operation of the system bus, whereby communications over that bus are adequate to enable all of the cards to efficiently share access to storage resources managed by the host computer system without significantly sacrificing real-time functionality of respective client systems.

Typically, individual computers in such a concentrated network conform to a standard computer system architecture (for example, the architecture associated with personal computers termed "IBM Compatible") and use standardized software operating systems for their processing and network communications function (e.g. an Operating System such as Microsoft's Windows NT™ Verson 4 operating system), although these are by no means restrictive or limiting, and it will be seen, at least in respect to functions relevant to architectural considerations of the present invention, computers using other architectures and other operating system software could readily be adapted to perform equivalent functions.

The system bus also is preferably constructed and utilized as an architecturally standardized system element; e.g. the bus can be configured as a standardized PCI bus conforming to published architectural standards; available e.g. through Internet site www.PCISIG.com. The limited length of this bus (as constrained by the present cluster environment) permit it to be operated at extremely high bit transfer rates, and thereby allow for the sharing of resources by computer systems on the present system board and diskless cards. Thus, data can be passed over this bus at rates that are much greater than rates associated with data transfers over ordinary local area networks (LAN's).

Other architectural characteristics of systems conforming to this invention are that presently contemplated diskless cards: 1) are removably attached to the system board through socket structures similar to socket structures provided in contemporary personal computer systems for device attachment cards; 2) may have a variety of different functional and hardware organizations, but are interchangeable in respect to their connectivity to the socket structures and the system board resources; 3) contain multiple chip-based components connected by an "internal" system bus representing an extension of the "external" portion of the system bus that is contained on the system board; 4) one of these components, that is uniformly present on all cards, is the MNIC chip referred to above, which provides standardized connectivity between the external system bus and the internal extension thereof in the card.

Another architectural characteristic of such systems is that certain devices and device adapters located on the system board, which are accessible to the diskless cards only via the system bus shared by all elements of the system, are nevertheless accessible at fast access rates that effectively enable cards to share system board resources while performing real time functions that in personal computer systems require resources dedicated to single computers.

Another characteristic is that the system is designed to accommodate a variety of cards having different processing characteristics and capabilities as computer systems but identical physical characteristics and electrical interchangeability in relation to the aforementioned system board sockets.

Another characteristic is that in systems having their host computer elements adapted to control routing of data packet communications between respective systems and networks external to such systems (e.g. local area networks and public access networks such as the Internet), the foregoing cards are able to exchange data packets directly with each other without requiring routing of such packets to a network hub external to the respective system; thereby reducing the data packet traffic that otherwise would have to be routed between the host system and external network hub.

Another characteristic of such systems is that their diskless cards can be operated as functional equivalents of intelligent personal computer terminals, using connections to broadband media capable of efficiently linking each card to devices remote from the respective cluster. Yet another characteristic is that the cards are economically and efficiently replaceable. Thus, a card technologically limited to supporting activities of a single client could be economically replaced, in the future, with minimal disruption of system utility, as technology advances to a stage wherein a card of comparable size and power consumption is able to support plural clients.

Another characteristic is that a present cluster would cost considerably less and occupy considerably less space than a cluster of separate computers having functionally equivalent computing power.

These and other characteristics, features, and benefits of this invention will be more fully understood and appreciated from the following detailed description.

DETAILED DESCRIPTION

1. Introduction

Figure 1:
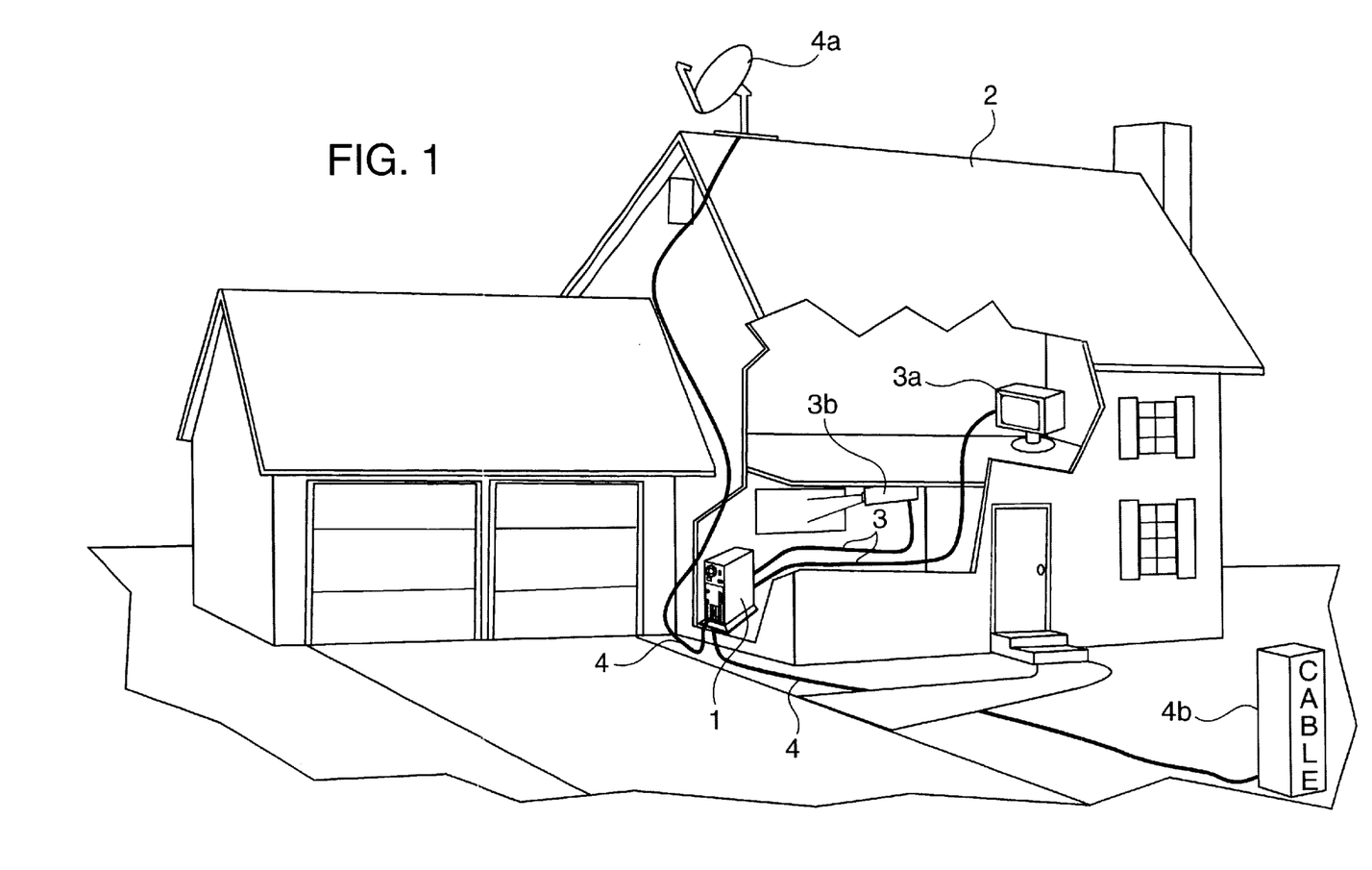
FIG. 1 illustrates how the invention may be used in the environment of a residential structure such as a single family house.

FIG. 1 shows a typical residential environment for application of one preferred embodiment of the present invention. A mini-console multiprocessor system unit, having a housing seen at 1 in this figure and in more detail in FIG. 2, contains a host computer and connections for attaching plural client computers; the latter contained on removable attachment cards. System unit 1 is located in residence 2—typically in a small area of the structure, such as a closet or a shelf in a storeroom or garage—and has connections to cables 3 within the residence and cables 4 extending outside of the residence. The host and client computers form a concentrated ultra-high-speed data communication network described later. In accordance with the invention, the client computers require minimal "on-board" memory resources and share access to resources managed by the host computer for efficiently performing their real-time processing functions.

External cables 4 may link to television distribution systems through a satellite communication antenna 4a and/or a cable box 4b as shown. Cables 4 also may be used in accordance with the present invention to link unit 1 to data communication networks external to the unit, for purposes discussed later.

Inside cables 3 link unit 1 to one or more "remote" television receivers 3a and image converting equipment 3b suitable for picture telephone applications. Lengths of the inside cables are restricted by data processing considerations discussed later. Inside cables 3 also link unit 1, via adapters not shown in this figure, to remote computer accessories—e.g. keyboards, mice, monitors, etc.—also not-shown in this figure. Linkage to such accessories allows for host and client computers in unit 1 to be operated as personal computers by individual users at various locations throughout the residence within a defined range of the unit (e.g. at distances up to 200 yards) determined by signal transmission capabilities of cables 3.

A similar arrangement can be used in a business office or factory environment, to link a unit such as 1, containing a host computer and client computers on cards, to plural users located in offices and/or factory workstations within a defined distance of the unit.

Another application of a unit of similar form but different function, that of a collection of network servers embodied in the host and client computers, also will be described later.

Utilizing chip technologies available today, the shape and dimensions of the housing of system 1 can be similar to the shape and dimensions of a contemporary personal computer mini-tower unit.

Figure 2:
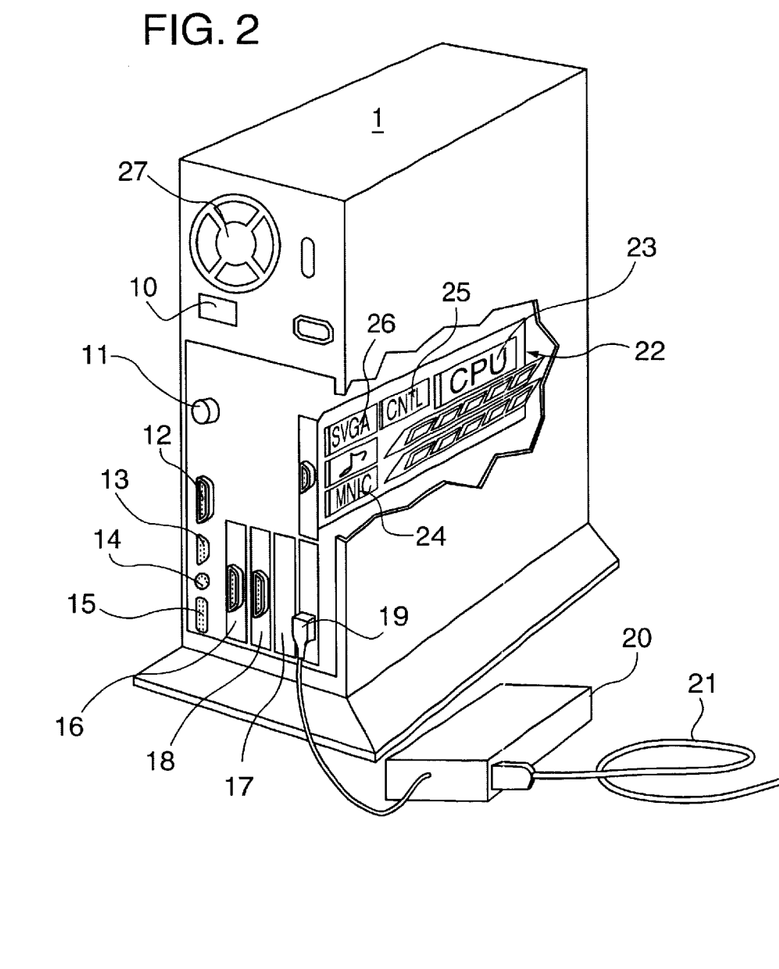
FIG. 2 provides a perspective partially cut-away view of the housing of a system unit conforming to the present invention and of apparatus connecting to a circuit card within the unit.

The host and client computers are modules which can be made in various forms and geared to most effectively perform various functions. As seen in FIG. 2, the rear panel of system unit 1 contains an ensemble of connectors associated with specific features of the host and client computers in the unit. The typical or representative ensemble shown in FIG. 2 includes: connector 10 for attaching the unit to a source of AC electric power, connector 11 for linking the unit's host computer to external personal computer accessories (e.g. keyboard and mouse), parallel port connector 12 for attaching printers and the like to the host computer, serial port connector 13 for attaching devices conforming to USB (Universal Serial Bus) architecture to the host, telephone plug connector 14 for attaching a modem within the unit to an external telephone system, connector 15 for linking the host computer to a display monitor, connector 16 for attaching a satellite communication antenna cable to one of the unit's client computer cards, connector 17 for attaching another client card to a video distribution cable, connector 18 for attaching a cable modem to another client card, and connector 19 for attaching an adapter 20 to a client card. Adapter 20 connects via coaxial cable 21 to not-shown personal computer accessories remote from the unit (e.g. to keyboards, mice and monitors operated by a remote user of the respective client computer).

As mentioned earlier, the client cards have modular form, to allow for use of a variety of different cards to achieve most effective processing of a variety of different types of applications. It is also understood that the system is so structured as to allow the cards to function efficiently utilizing shared access to memory and storage resources external to the cards that are managed by the host system, and thereby to allow for such cards to be constructed with minimal onboard memory without unduly degrading their potential performance.

Also, shown in a cut-away view at 22 is a typical client card conforming to the present system architecture. As seen here, the card contains a CPU (central processing unit) 23 on one or more chips, a modular network interface chip (MNIC) 24, a controller chip 25 and an SVGA chip 26. CPU 23 executes programs stored external to the card which are accessed ultra quickly through a system bus described later (see discussions of FIGS. 3 and 4, to follow). Although the type of CPU 23 used may be different for different cards, cards conforming to the present architecture will have identical MNIC chip elements 24. Circuitry on chip 24 is shown and explained later with reference to FIG. 4. Functions of chips 25 and 26 will be explained later. Fan 27 is provided to remove heat generated by components in unit 1.

Options seen in this figure include a connection 28 for a security chain and a tag 29 displaying UL$^{SM}$ (Underwriters' Laboratory) certification.

Figure 3:
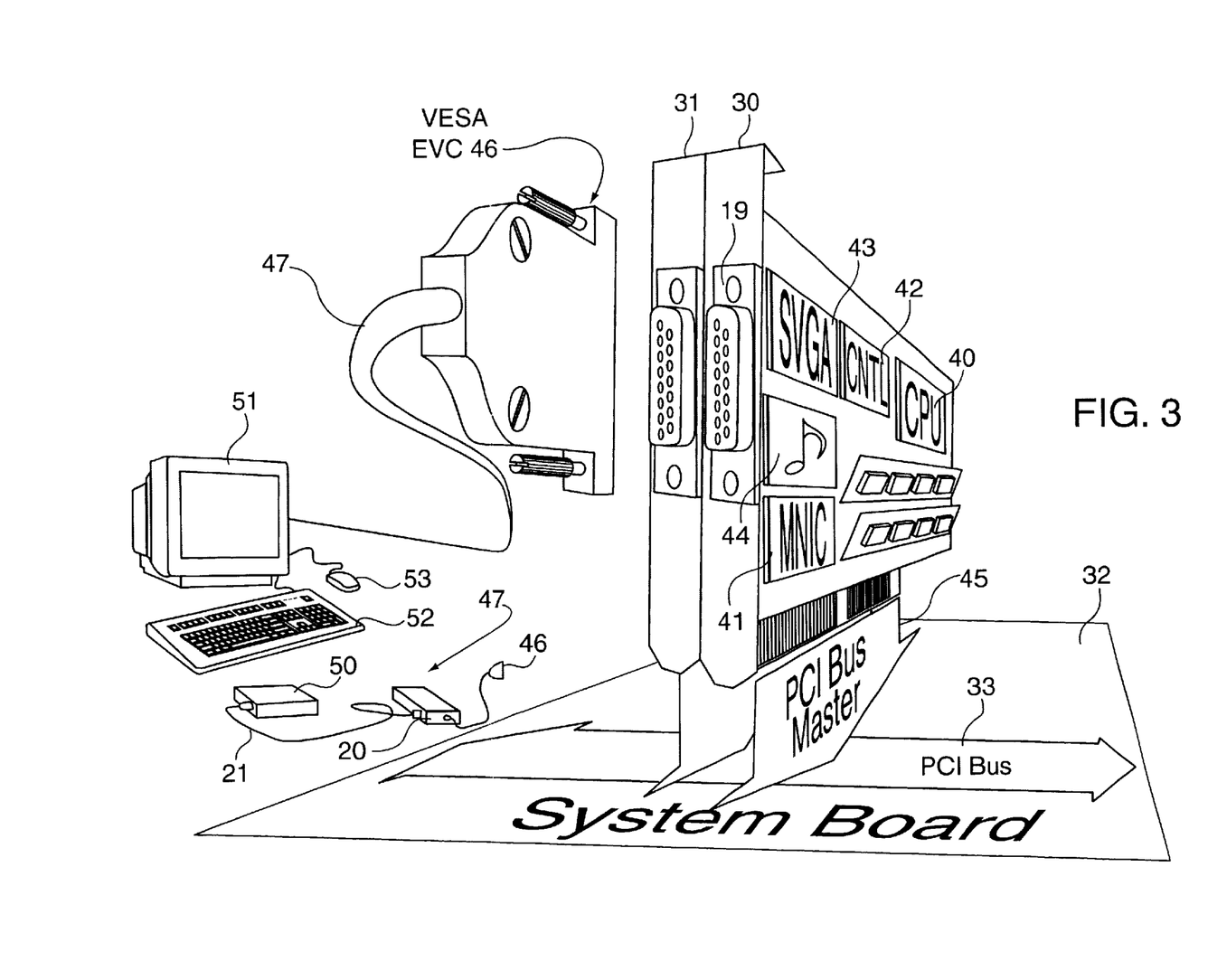
FIG. 3 provides a perspective view of computer cards used in the system unit of FIG. 2, illustrating their relation to a system board and system bus within the unit and computer accessories remote from the unit.

The configuration and usage of client cards as personal computers serving remote users (via external connections 19–21 to personal computer accessories) is indicated in FIG. 3. As seen here, client cards 30 and 31 attach removably to a system board 32, via not shown socket structures affixed to the board, and connect to a system bus 33 contained on the same board. Bus 33 preferably is configured and operated in accordance with previously noted published specifications for PCI buses. System board 32 constitutes the principal substrate of the system, and the host computer system and resources managed by it (including disk storage and RAM memory) are mounted directly on that substrate. Connections extend from bus 33 to the client computers, via their not-shown sockets) and to the host system and its resources. These bus connections enable the client cards to exchange data with each other, with the host system, and with resources managed by the host system.

As shown here, client card 30 has the components mentioned above in the discussion of card elements in FIG. 2. These include an external connector 19, a CPU here shown at 40, an MNIC chip here shown at 41, a controller chip here shown at 42 and an SVGA circuit here shown at 43. Also included is an audio processing circuit 44 corresponding to an element which is indistinctly viewed in FIG. 2. As indicated at 45, the card usually operates as a bus master relative to PCI bus 33. However, it will be seen later that in certain modes of operation relative to the host computer the card may be operated as a bus slave.

In use, external connector 19 attached to adapter 20, through a mating VESA connector 46 and conductor 47.

Adapter 20 attaches to a standard 75 ohm coaxial cable 21 (see also FIG. 2). Cable 21 has one signal conducting line surrounded by a grounded shield. Information signals in modulated form are transmitted over this cable for purposes explained later. Although cable 21 has conventional construction, it is believed that the usage proposed presently may be unique. Cable 21 extends, over a distance of up to 200 meters, to a remote adapter 50, the latter connecting the cable to personal computer accessories including monitor 51, keyboard 52 and mouse 53. As illustrated, connector 46, cable 21 and adapters 20 and 50 are components of conductor 47. Connections from adapter 50 to accessories 51–53 are made via not-shown conductors extending individually to the accessories.

In operation, display controlling signals appearing at connector 19 are converted by adapter 20 into modulated signals sent over cable 21, get demodulated at adapter 50, and are applied from there to monitor 51 (via a separate conductor not-shown). This results in creation of viewable images on the monitor defined by signals emitted from associated client card 30. Computer input signals originated by a user at the remote site are sensed at keyboard 52 and mouse 53, converted by adapter 50 to modulated signals, sent over cable 50 in that form and demodulated at adapter 20 to a baseband format suitable for application to the client processor on associated card 30.

If the system is intended for multimedia effects, digital signals representing audio information are routed, via cable 21 and adapters 20 and 50, between connector 19 and not-shown speaker and microphone devices at the remote user site.

2. Information Transmission on Cable 21

Figure 4:
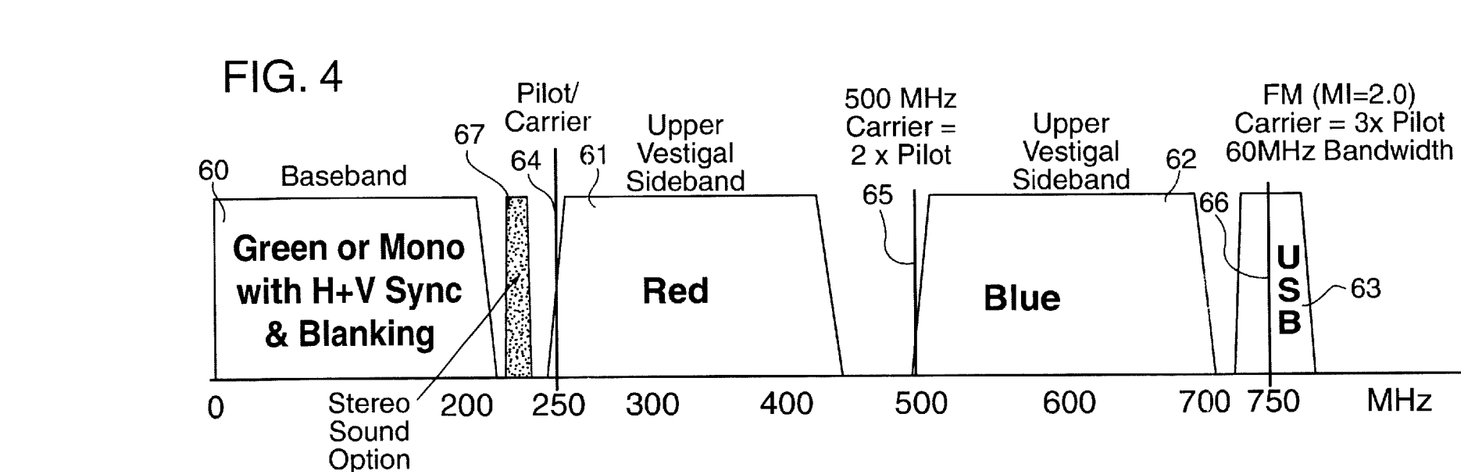
FIG. 4 is a chart illustrating a presently preferred arrangement for using the frequency spectrum of an external coaxial cable seen in FIG. 3 to convey information between present system unit computer cards and their remote accessories

The chart in FIG. 4 is used to explain a preferred method of transmitting information on coaxial cable 21. The horizontal axis represents frequency in Mhz (megahertz) units. Video and color information, for operation of display monitors and such, is sent as modulation (either frequency or amplitude modulation) over portions of the frequency spectrum indicated at 60, 61, and 62. Signals designating green pixel tones and/or gray shades are sent in band 60. Information representing red pixel tones is sent over band 61. Information representing blue pixel tones is sent over band 62. Information representing green pixel tones is sent over band 60. Finally, data being transferred in conformance with presently used USB (Universal Serial Bus) protocols is sent over band 63.

Frequencies indicated at 64, 65 and 66, which are multiples of 250 Mhz, are respectively used as carrier pilot signals for the red, blue and USB transmissions; so as to effectively reduce the number of continuous frequency signals being transmitted; with the consequent effect of lessening any electromagnetic interference or noise which could issue from the cable. In addition to pixel tone (green/gray) information, signals representing stereo sound are transmittable in the band 67 around 225 Mhz, and all other data, representing neither display nor sound functions, is sent in a form conforming to USB specifications in the band 63 around pilot carrier 66.

3. System Unit Architecture

Figure 5:
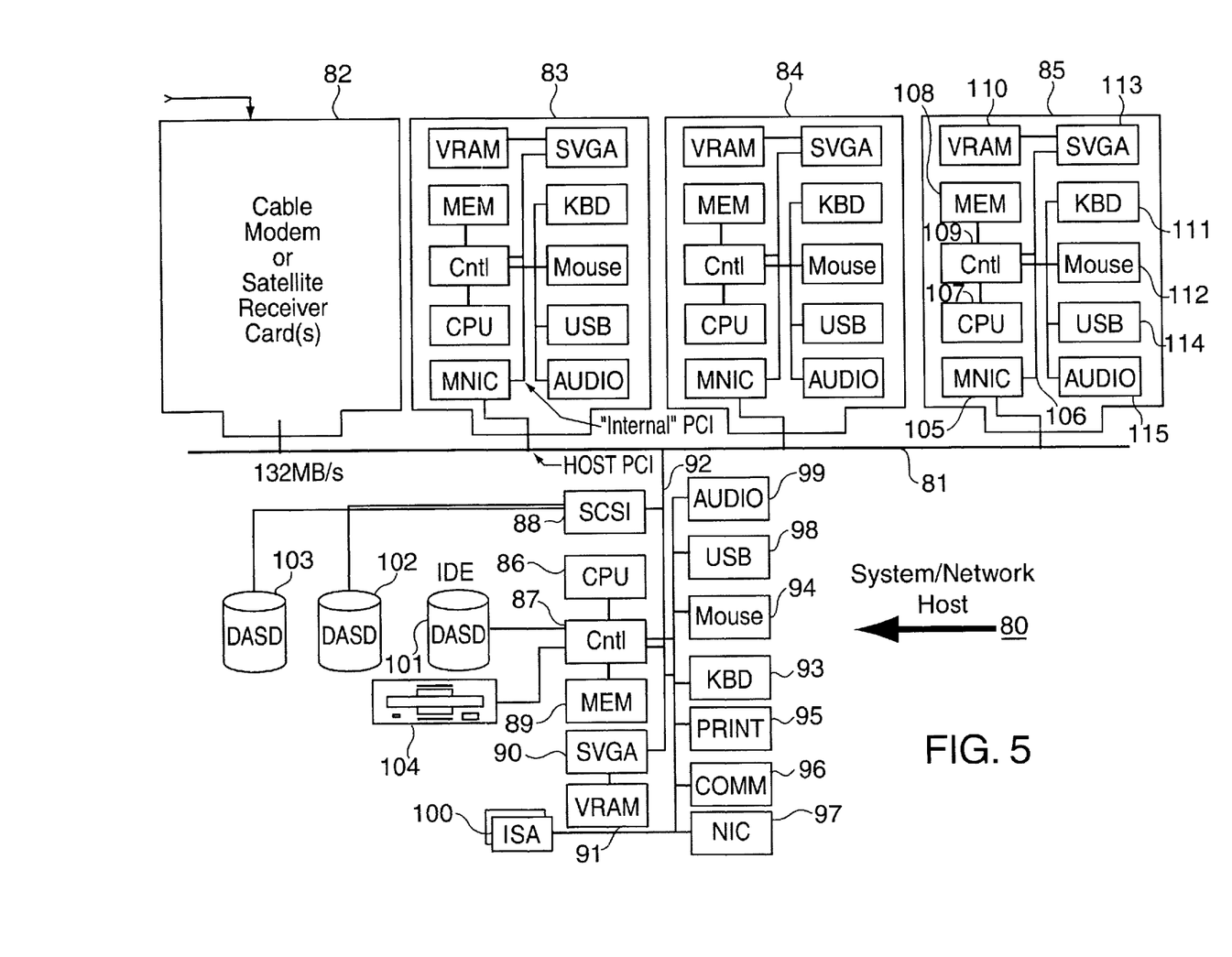
FIG. 5 is a block diagram providing an overview of the presently contemplated system unit architecture.

The block diagram in FIG. 5 illustrates the logical architecture of the system unit. The host processor and other elements mounted directly on the system board are indicated at 80. The other elements include the system PCI bus, shown at 81. Bus 81 is termed the PCI bus, since it is assumed here to conform to presently well-known PCI bus architecture specifications and to be operable in accordance therewith. Cards removably attached to not-shown sockets within the unit are shown here at 82, 83, 84 and 85. In the example shown, these cards include both client computers and other devices.

In this example, card 82 is an adapter, such as a cable modem or a satellite receiver card, for interfacing to a television distribution network external to the unit, and cards 83–85 are client computer systems having not shown external connections to accessories like the connection 19 in FIG. 3. Cards 82–85 are of particular interest presently, being considered part of the system architecture associated with our invention. These cards are assumed to have identical constructions in the presently shown configuration, but may have different constructions in other configurations. Accordingly, the discussion below of the circuit construction of card 85 applies to cards 83 and 84.

The host system and its accessories include all of the elements shown below PCI bus 81 in this diagram. This includes the host CPU (central processing unit), shown at 86, bus and memory controller 87, SCSI adapter 88, random access memory (RAM) 89 sufficient to simultaneously contain programs and data used by CPU 86 and all of the cards 82–85, SVGA (super VGA) display control logic 90, VRAM (video RAM) 91, and a secondary bus 92 linked to controller 87. Other host-related elements attached to bus 92, considered mostly optional, include host keyboard adapter 93, mouse adapter 94, printer adapter 95, communication adapter 96, network interface circuit card (NIC) 97, USB adapter card 98, audio adapter card 99, and ISA adapter circuits 100. NIC 97 may connect to a network external to the unit and in that circumstance the host system operates as a server between the respective network and the cards 82–85.

The system board in this example also supports electromechanical storage devices 101–104. These include disk store 101 controlled by circuits 87, disk stores 102 and 103 controlled by SCSI adapter 88, and diskette storage device 104.

Cards 82–85 each contain almost complete client computer subsystems. These subsystems are termed almost complete because they generally lack storage capacity to operate as self-sufficient stand-alone systems, like personal computers commonly available today, wherein all programs and data used by a respective system are contained in unshared devices. In the system shown here, the cards and the host system are expected to share access to the memory and storage resources shown at 89–90 and 101–104, for most if not all real-time program execution requirements. Furthermore, since the cards have access to these resources only via PCI bus 81, operation of this bus must be sufficiently fast to permit each card to access all data and programs it requires in coordination with its real time execution of the programs.

As indicated for card 85, that card (as well as identical cards 83 and 84) contains the following circuits and internal bus structures: a modular network interface chip (MNIC) 105 which interfaces between PCI bus 81 and an internal PCI bus 106 which interfaces to all other elements on the respective card; CPU 107; RAM memory 108 (a buffer sufficient e.g. to store a portion of program information and data currently being processed at 107); controller 109 interfacing between RAM 108, CPU 107 and bus 106; video RAM 110; keyboard and mouse adapters 111 and 112 for interfacing between the card subsystem and non-shown connections to remote keyboard and mouse accessories (refer to discussion of FIG. 3 supra); SVGA adapter 113 interfacing to not-shown connections to a remote display monitor as described earlier; and optional adapter circuits 114 and 115 for respectively processing USB and audio signals.

In this configuration, the host processor and associated resources on the system board serve as the main interface to networks external to the building or structure housing the system, and the cards serve as processors relative to accessories at remote sites within the same building or structure. The tightly integrated configuration of the system, and the speed of operation of the system bus (132 Mb/sec) permits each card to rapidly access program information and data stored on the system board without having to store sizable portions of such on the respective card. Thus, all of the storage resources of this system are subject to more efficient use than in a system of conventional personal computers linked in a network.

Furthermore, the external connection of the card to remote user accessories (refer to previous discussion of external connections shown in FIG. 3) enables the card to rapidly exchange information with such accessories and thereby—in combination with the shared use of system board memory and storage—provide more efficient computing services than a comparably equipped personal computer.

4. MNIC Components

Figure 6:
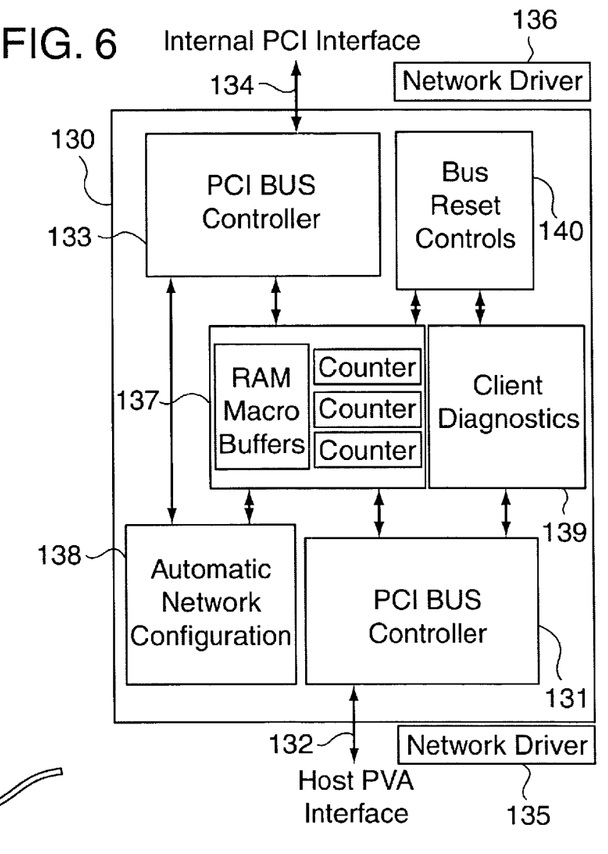
FIG. 6 is a block schematic of a modular network interface chip (MNIC) circuit which is a component of all cards conforming to the present architecture.

The logical organization of the modular network interface chip is shown in FIG. 6. The chip, seen at 130, contains a first bus controller 131 interfacing at 132 to the PCI bus of the host subsystem (e.g. to bus 81, FIG. 5) and a second bus controller 133 interfacing at 134 to a PCI bus internal to the respective client computer card (e.g. to bus 106, FIG. 5). Network drivers, seen at 135 and 136, control operations of the chip relative to respective PCI bus interfaces 132 and 134. Memory/RAM buffers and counters used in the operations of the chip are seen at 137. Logic 138 is used for automatically configuring the respective chip and card as an element of a network containing the host subsystem and other cards. Logic 139 is used for conducting diagnostic tests relative to the respective client card. Bus reset controls 140 are used to reset the internal and external bus interfaces in response to error conditions internally detected by the chip and its diagnostic logic 139; thereby providing a mechanism for recovery of the respective card from error conditions which otherwise could render the card and its circuitry either inaccessible or otherwise inoperative or unresponsive.

The function of the MNIC chip is to link the internal and external bus interfaces, 134 and 132 respectively, for transferring information and control signals between the internal components of the respective card and the host system and its storage and other resources (see FIG. 5). For this, each bus controller is operated as both a bus master and a bus slave relative to its respective bus interface, depending upon the signaling function being performed. These interfaces, in the presently preferred embodiment, operate in conformance with general specifications for PCI buses Version 2.1, and may be similar in design to existing adapters for attachment of peripheral devices to personal computer systems.

The RAM buffers and counters at 137 operate as bidirectional FIFO's (queues with first-in first-out ordering), in a manner that is well known and extensively used in existing technology.

As explained later, the host and client bus systems run in several different signaling modes, each supported by the MNIC. These modes include one presently termed Direct Control (DC) mode and another termed Peer-to-Peer Networking (PPN) mode.

In DC mode bus interfaces are directly controlled, over one or two bus clocking cycles, to transfer data bytes between a resource in the host system (e.g. motherboard RAM) and a designated component on the client card (e.g. an address in a RAM buffer). The number of data bytes transferred in this manner depend upon the number of parallel data conductors in the bus. DC mode, or a variation thereof, is used by the host system to perform diagnostics relative to the client cards.

In PPN mode, bus interfaces are controlled in a network protocol, over 1 to n bus cycles (n>2), to transfer data in packet form between ports representing network addresses on the bus. In this mode, the bus and its connections form a concentrated network wholly contained within the present system unit.

The number of data bytes transferrable in a PPN mode transfer is much greater than the number of bytes transferrable in a DC mode process, and the control information accompanying data in a PPN mode transfer is quite different from the signals needed to control the bus in a DC mode process.

Another difference between PPM and DC mode functions is that PPM mode can be used by client computer cards to directly transfer data between cards, whereas in DC mode transfers relative to a card, data is usually transferred only between the card and either the host system or storage resources associated with that system.

Operating in PPM mode, the host subsystem can function as a network server between the internal network formed on the PC bus and an external network directly connected to the host (see e.g. the previously described function of NIC chip 97, FIG. 5). Furthermore, client cards can use PPM mode processes to operate as network servers between external networks connected directly to respective cards and the rest of the respective system unit; i.e. the other cards and the host system (see discussion of server farm configuration to follow).

Operations associated with DC and PPM modes are explained in the next section. Also, operations in and usage of PPN mode are more fully described in the previously cross-referenced co-pending patent application by Callender et al.

5. Bus Operations in DC and PPM Modes

Operations of the host and client cards in DC and PPM modes are explained with reference to FIGS. 7 and 8.

Figure 7:
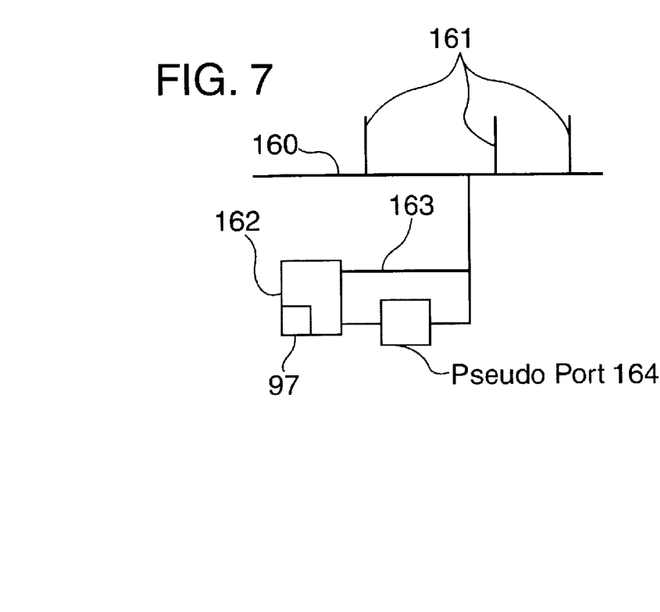
FIG. 7 is a schematic for explaining different communication configurations used by the host computer subsystem of the unit shown in FIG. 5 for communicating with computer cards installed in the same unit.

FIG. 7 provides a simple schematic view of the present system suitable for explaining differences between DC and PPM transfers. In this view, the PCI bus is seen at 160, and its connections to client cards are indicated at 161. The host system 80 of FIG. 5 is shown here at 162, and the NIC component connecting the host system to an external network is shown at 97. Also shown here, at 163 and 164 respectively, are direct and indirect connections between the host system and PCI bus 160. Connection 163 is a physical link and connection 164 is a virtual link presently termed "pseudo port". Pseudo-port 164 is a software construct used typically by network applications executed by the host CPU. Its sole purpose is to serve as a buffering layer isolating the bus from the host system during network transfer functions, thereby maintaining software compatibility with existing network operating systems such as Windows NT.

As shown here, the PCI bus and its connections are used as a self-contained network entirely internal to the illustrated modular system. The host system links to this network through pseudo-port 164, and the client computers link to this network through their connections 160, 161. Typically, the host system is configured to selectively route data between pseudo-port 164 and either itself or its external network link 97.

Figure 8:
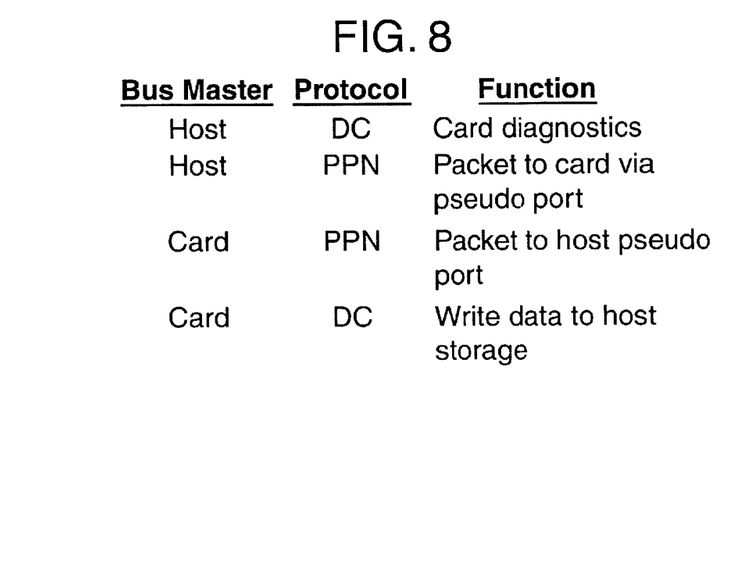
FIG. 8 is a table showing various different communication protocols used by the host and card computers of the present system unit for transferring information over the system bus common to the unit.

The table in FIG. 8 is used to explain how DC and PPN modes are used relative to the bus configuration shown in FIG. 7.

The column at the far left of this table indicates which side of the bus operates as bus master during signal/data transfer functions indicated in the column at the far right. The middle column of the table indicates the bus protocol involved in each transfer function.

The first row entry in the table indicates that diagnostic tests of client cards by the host are conducted in DC mode, with the host system controlling the PCI bus as bus master. The next row entry indicates a network packet transfer from host to a card, conducted in PPN mode, with the host system again the bus master. It will be understood that the reverse of this, a packet transfer from card to host, would be conducted with the originating card acting as bus master. The next entry indicates Read and Write transfers of data between host system memory and a client card, in DC mode, with the bus master indicated as "Card". Not shown in the table, but understandable from what is shown, is that in signal transfers from host to card (e.g. transfers indicating memory allocations), either side—host or card—could act as master. The last row entry indicates a client-to-client PPN packet transfer, in which the origin client card acts as master. Implied here is that (for this function) the destination card is typically (but not necessarily always) a slave; i.e. alternatively, the destination card could be a master and the host or origin card a slave.

Those skilled in the art will readily understand that PPN transmissions will contain a data packet encapsulated in a header, the latter providing (bus) address information indicating the origin and destination of the packet. The pseudo-port and client connections will have pre-assigned addresses in the internal network. When the origin or destination is the host system, its address will be the address pre-assigned to the pseudo-port. It is understood that when the origin or destination is external to the host system, the header address intelligence will designate that origin or destination in addition to the pseudo-port address.

6. Alternate System Configuration For Net Server "Farms"

Figure 9:
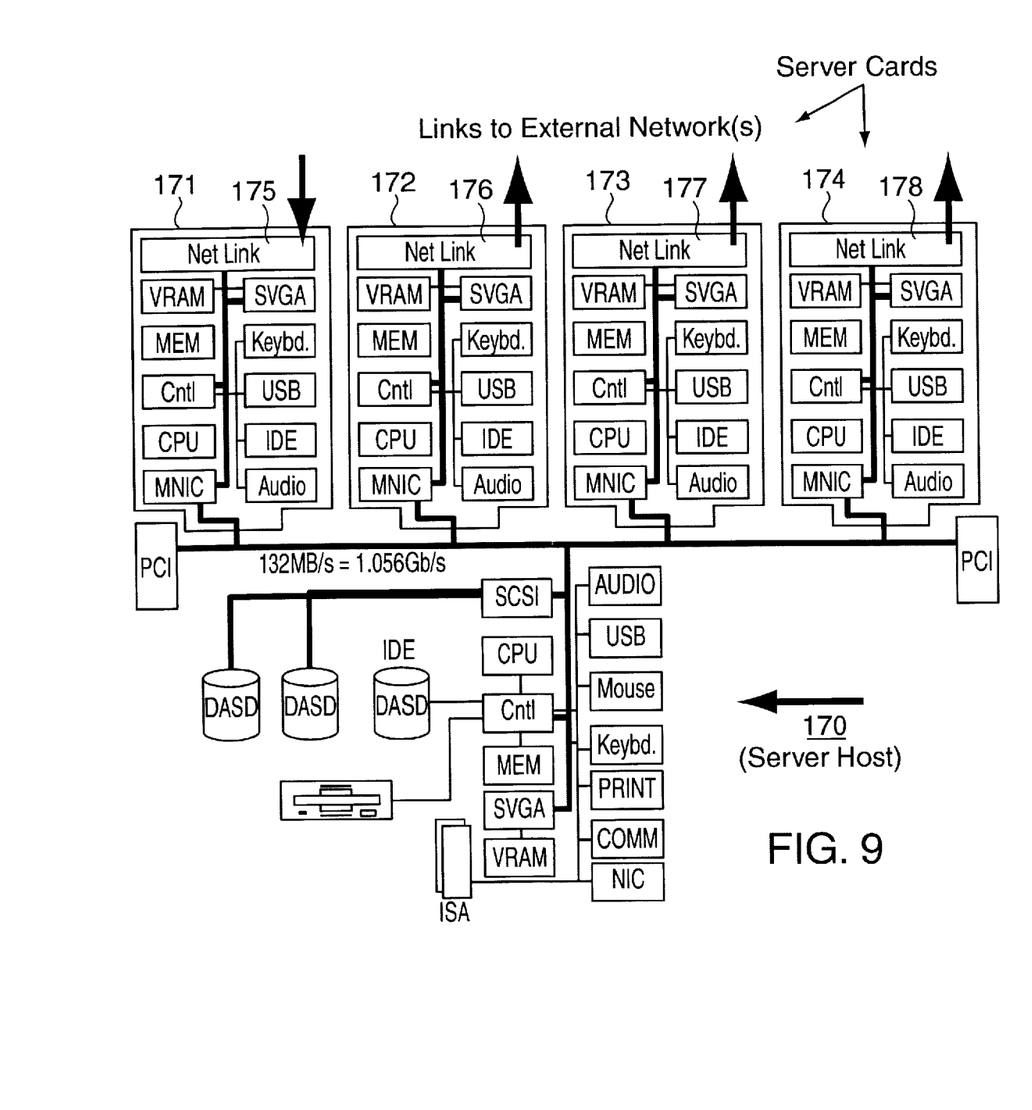
FIG. 9 is a block diagram of an alternate configuration of host and card computers illustrating how a unit conforming to the presently contemplated architecture could be adapted to form a collection of servers interfacing to networks external to the respective unit.
Figure 10:
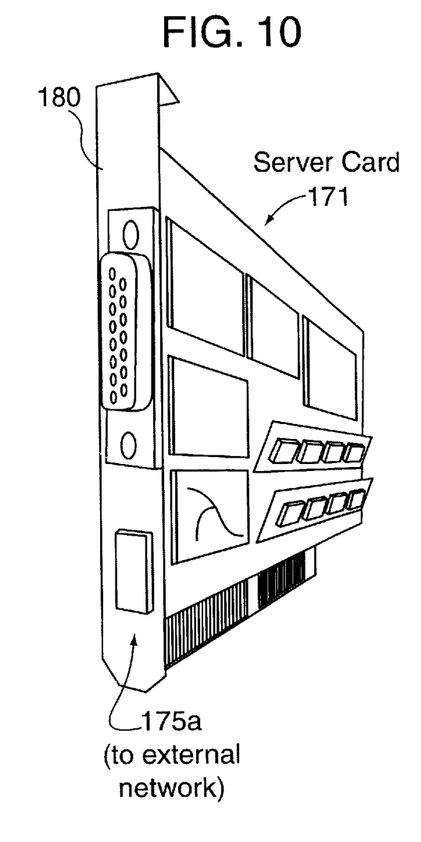
FIG. 10 is a perspective of a client card in FIG. 10 for explaining external connections to the card.
Figure 11:
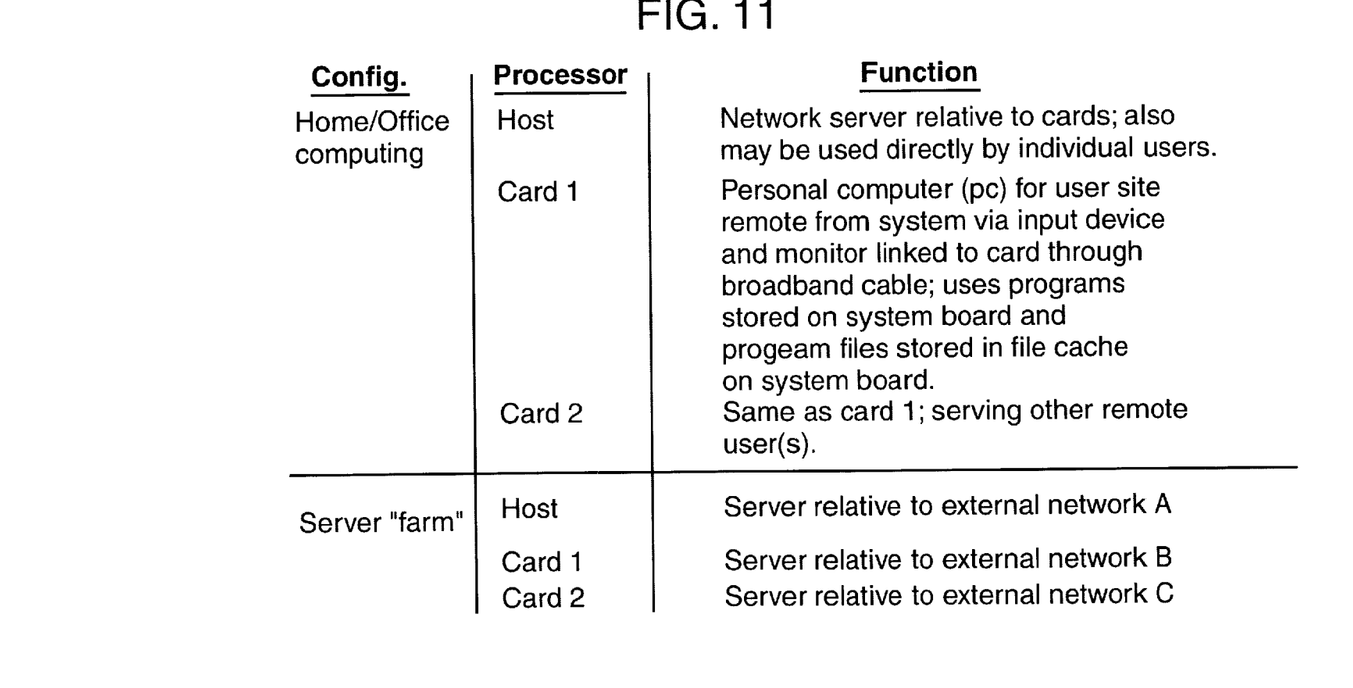
FIG. 11 is a table comparing uses of various configurations of the invention

FIGS. 9–11 are used to describe an alternate embodiment of the invention—wherein the host system and one or more client cards connect to one or more networks external to the modular system unit constituting the invention—and to compare that alternate embodiment with the embodiment described above (wherein all of the client cards are useful as personal computers serving remote users within a residence or office environment).

In FIG. 9, the host system, including associated accessories, is indicated at 170, and four client processors are indicated at 171 through 174. In this figure, the components of the host system are basically the same as in FIG. 5, and components of the client systems include some or all of the respective client components shown in FIG. 5. The difference in FIG. 9 is that each client system includes an additional component, designated "Net Link", for adapting the respective client system to connect to an external data communication network. For the processors 171 through 174, these additional components are indicated respectively at 175 through 178. It is understood that these additional network adaptation components may be embodied in integrated circuit chips, and that they may be individually formed to connect to different types of data communication networks (e.g. Ethernet, telephone systems, cable systems, etc.).

As shown in FIG. 10, and intended to be representative of all client cards seen in FIG. 9, the rear panel 180 of client card 171 contains a connector 175a for attaching the respective Net Link component 175 of that card to a network external to the respective card.

In the configuration shown in FIG. 9, the host system operates as a data router and server between the client systems and an external network to which the host connects (via its NIC component), and each client system acts as a data router and server between the other client systems and the host system. Thus, in this configuration, each client system must be able to efficiently handle all of the real time applications needed to perform respective routing and server functions, while relying on shared memory resources on the system motherboard for access to software associated with such applications. In effect, the host and client systems shown in FIG. 9 form a collection of servers, also referred to herein as a "server farm".

Those skilled in presently relevant arts will readily appreciate that the alternate configuration of FIG. 9 could be varied to include some client cards configured exclusively or primarily as network interfacing computer systems and other cards configured exclusively as personal computing type systems such as those suggested in FIG. 5.

The table in FIG. 11 indicates how the host and client systems are used in the system configurations of FIGS. 5 and 9. In the "home/office/small factory" application of FIG. 5, the host processor, in addition to managing associated resources on the motherboard, operates as a network server between an external network to which the host attaches and the client processors; and the client processors operate as minimized personal computer subsystems relative to individual user input/output accessories to which they attach via coaxial cable (refer to FIGS. 2 and 3).

In the "server farm" application of FIG. 9, one or more client subsystems connects directly to an external network, and operates as a server between that external network and the rest of the system (i.e. the host and other client subsystems). In this capacity, the client subsystem/server would require an external NIC (network interface connection) port and an appropriate connector, but may not require the user interface connection associated with typical residential usage (i.e. connections such as 17, FIG. 2, and 19, FIG. 3). Depending upon its intended usage, a subsystem/server also may require more onboard RAM memory and faster CPU performance than its counterpart module in residential applications.

7. File Cache Usage

Figure 12:
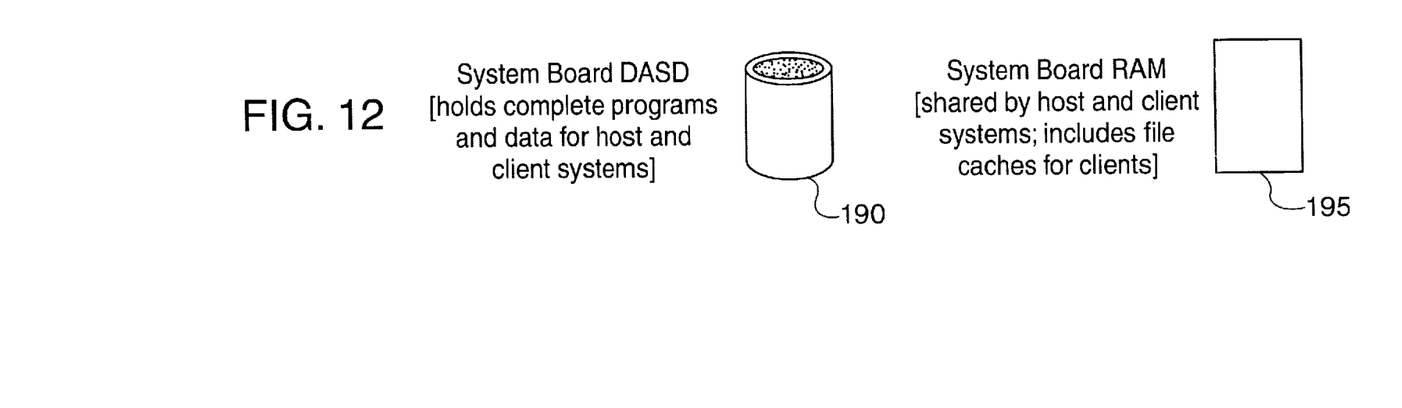
FIG. 12 is a schematic illustrating uses of host storage and memory resources in accordance with this invention.

FIG. 12 indicates usage of host system storage resources; with particular emphasis on the present feature of allocating a portion of memory to each card as a "file cache". As is presently well known, file cache is used in processing systems to store "file" portions of large programs containing many files, so that memory is utilized more effectively by not having to store portions of such programs that are not currently required by a program application instantly being executed. What is considered interesting presently is that this concept can be extended to the shared memory environment supporting client cards of the presently disclosed system.

As seen in FIG. 12, secondary storage resources 190 (shown as direct access storage devices but understood to include any comparable devices) store programs and data which may be required by the host and all of the client systems, and primary storage resources 195 (e.g. RAM's) store program information and data immediately being used by the host and client systems. Included in the resources 195 are portions allocated as "file caches" for program files currently being executed by the host and client systems, so that files in use in any client system, which may contain large portions of even larger program, need not be stored in their entirety on the card containing the respective system.

In a typical operating system such as Windows NT, memory not in use for other purposes is allocated as a file cache. This cache serves to store program files or page fragments of files frequently used by the processor of the system, such that access to the stored information is available faster than it would be relative to electro-mechanical storage. In most contemporary systems, file cache is used by only a single processing entity; usually, one having access to the respective storage facility through a special bus connection not shared with other devices.

The difference presently is that the file cache is shared by plural processors, some of which have access to the cache only through a bus shared with other elements of the system, and require such access to sustain their real-time software execution processes.

8. Extensions and Applications of the Invention

The following observations are directed to applications and extensions of the invention. Although these may possibly be evident to one skilled in the art, given the preceding description, they are described here for completeness.

Although embodiments described have sockets for a restricted number of client cards—typically only 4 to 5 sockets, it should be recognized that with present trends in technology it will be increasingly possible to accommodate many more client in these embodiments than can be efficiently supported today. Present technology trends clearly lead to progressively increased density of packaging of integrated cards, chips and circuits within chips, as well as to progressively increasing speeds of operation of such structures. Furthermore, similar trends are indicated in speeds of operation of computer system buses. Thus it is envisioned that: a) future systems will be able to efficiently accommodate more client cards than presently practical systems; b) such cards will contain many more circuits than present cards, and possibly even several client computer subsystems on each card; and c) efficiently support real time operations of such denser circuitry, including operations needed to enable all client subsystems to efficiently access host storage without unduly delaying real-time processes in the subsystems in respect to retrieving data immediately required for continuation of any process.

Thus, for example, using client subsystems as workstations/PC's, and a host linked to a public data network (Internet, telephone system, etc.), the present applicants envision that a system could be made that would: a) contain as many as 8 client cards, each card containing as many as 4 complete workstation subsystems; and b) sustain efficient operation of each workstation subsystem at a level of efficiency sufficient to fully support multiple application processes concurrently at a level of speed in each subsystem comparable to that of a present day stand-alone workstation.

Furthermore, since each client subsystem can be configured as a workstation or server or both, it is envisioned that a modular system of the present type would be able to efficiently link to multiple data networks (public and/or private) external to the system.

With the foregoing possibility of accommodating large numbers of client subsystems within a single modular system, and possibly multiple concurrent application processes in each subsystem, it is understood that a system of this type would be readily adaptable to sustain a large number of concurrent applications. Thus, in each environment of use—residential, office, small business plant, etc.— it is envisioned that the system and its client subsystems could be readily adapted to control many processes relevant to the environment; for example, in the residential environment, processes relevant to controlling activation and deactivation of appliances, processes relevant to delivery and/or recording of television programs, processes relevant to individual user workstations, etc.; wherein the aggregate number of such processes could be m×n, and m and n respectively denote the number of subsystems (client and host) and the number of application processes that can be concurrently sustained by each subsystem. Since m and n are potentially large integers (e.g. each potentially greater than 4), it should be understood that the number of processes that could be sustained is correspondingly large.

The foregoing and other aspects of this invention are defined in the following claims.

What is claimed is:

1. A modular architecture for a spatially concentrated computer system, said system containing principal components including a host processor, storage resources managed by said host processor, a system bus coupled to said storage resources, and plural sockets connected to said system bus for receiving removable cards containing client computer devices, said architecture being characterized in that:

said principal components are concentrated such that the length of said system bus can be effectively minimized, so as to allow said bus data transfer rate to be very high, said space being sufficient to also contain said client computer devices;

said client computer devices have modular forms, allowing for a variety of different client devices to be plugged into each socket, and said client computer devices include self-contained programmable computer systems which require access to said storage resources, via said bus, during real-time execution of their programs;

said bus is operated at a speed sufficient to enable each said client computer device to function efficiently while sharing access to said storage resources with said host processor and other said client devices for retrieving program information required by the respective client device to perform its functions; and wherein said modular client computer devices are connectable to a coaxial cable containing 3 signal bearing lines; a first one of said lines being used to carry information in an unmodulated form constituting intelligence for forming a video display, a second one of said lines being used to carry data in modulated form between said card and said remote equipment; and a third one of said lines being used to carry signals for synchronizing reception of data sent from said card to said remote equipment and transmission of data sent from said remote equipment to said card.

2. The modular computer system architecture in accordance with claim 1 wherein:

said concentrated space is contained within a housing unit comparable in size to housing units enclosing contemporary personal computer systems;

said housing unit contains a principal integrated circuit substrate on which said principal components are mounted;

said principal component sockets are adapted to receive integrated circuit cards containing said client computer devices; and said housing unit contains external connector openings allowing for delivery of electrical power to said principal components and said computer devices, and also allowing for attachment of said host processor and said client devices to device entities external to the respective network system enclosed within said housing unit.

3. The architecture in accordance with claim 1 wherein said storage resources include a random access memory having apportion thereof allocated for use as a file cache intended to be shared by said host processor and all of said client computer devices.

4. The modular architecture in accordance with claim 3 wherein portions of said file cache allocated to said client computer devices have sufficient capacity to store program files constituting portions of programs instantly being executed by respective client devices, and wherein said bus is operated at a speed sufficient to enable each client device to efficiently execute programs of arbitrary size using program file information contained in the file cache portion allocated to the respective device, without having to store that program in its entirety on the card.

5. The modular architecture in accordance with claim 1 characterized further in that:

said host processor and client computer cards are adapted to communicate via said system bus using a plurality of different signaling protocols; said protocols including a first protocol enabling said host processor to perform diagnostic functions relative to said client computer devices, a second protocol enabling said cards to individually control said bus, as bus masters, for accessing said storage resources via said bus, and a third protocol enabling said client computer devices to communicate with each other and with said host processor as elements of a data communication network having address ports only on said bus.

6. The modular computer system architecture in accordance with claim 1 wherein said system bus is a PCI bus.

7. A modular architecture for a spatially concentrated computer system, said system containing principal components including a host processor, storage resources managed by said host processor, a system bus coupled to said storage resources, and plural sockets connected to said system bus for receiving removable cards containing client computer devices, said architecture being characterized in that:

said principal components are concentrated such that the length of said system bus can be effectively minimized so as to allow said bus data transfer rate to be very high, said space being sufficient to also contain said client computer devices;

said client computer devices have modular forms, allowing for a variety of different client devices to be plugged into each socket, and said client computer devices include self-contained programmable computer systems which require access to said storage resources, via said bus, during real-time execution of their programs;

said bus is operated at a speed sufficient to enable each said client computer device to function efficiently while sharing access to said storage resources with said host processor and other said client devices for retrieving program information required by the respective client device to perform its functions;

said host processor and client computer cards are adapted to communicate via said system bus using a plurality of different signaling protocols, said protocols including a first protocol enabling said host processor to perform diagnostic functions relative to said client computer devices, a second protocol enabling said cards to individually control said bus as bus masters for accessing said storage resources via said bus, and a third protocol enabling said client computer devices to communicate with each other and with said host processor as elements of a data communication network having address ports only on said bus; and wherein said third signaling bus protocol is a local area network (LAN) protocol in which data is transferred on said system bus in the form of packets accompanied by origin and destination address indications, and in which addresses designated by said address indications specify connection ports on said system bus, said connection ports including said sockets.

8. The modular architecture in accordance with claim 7 wherein said host processor uses a simulated pseudo-port connection to said system bus when communicating in said LAN protocol; wherein said pseudo-port constituting one of said connection ports specifiable by said address indications; and wherein said pseudo port is accessed by said host processor using a program emulation serving to isolate other software running on said bus.

9. For a multiprocessor system consisting of client computers based on integrated circuit cards, a host processor, storage resources, and a system bus connecting said client computers with each other and with the host processor, a client computer card comprising:

a modular network interface (MNI) circuit adapted to connect to said system bus and to operate relative to said system bus as both a bus master and a bus slave;

a central processor unit (CPU);

an internal bus on the respective card, said internal bus connecting said CPU to said MNI circuit for enabling said MNI circuit to route information signals between said CPU and said system bus;

said client computer card having a connector for connecting said card to a broadband communication medium, said connector enabling said card to exchange digital information at high speeds, in a modulated form, with equipment remote from both said card and a multiprocessing system containing said card; said card together with said remote equipment constituting an intelligent terminal operable by an end user interacting with said remote equipment; and wherein said broadband medium is coaxial cable of the type used in commercial cable television distribution, said cable containing 3 signal bearing lines, a first one of said lines being used to carry information in an unmodulated form constituting intelligence for forming a video display, a second one of said lines being used to carry data in modulated form between said card and said remote equipment, and a third one of said lines being used to carry signals for synchronizing detectors in said remote equipment that are responsible for synchronizing reception of data sent from said card to said remote equipment and transmission of data sent from said remote equipment to said card.

10. The computer card in accordance with claim 9 wherein one of said 3 signal bearing lines is configured to contain a data transfer channel operated in accordance with Universal Serial Bus (USB) standards.

11. The modular computer system architecture in accordance with claim 7 wherein:

said concentrated space is contained within a housing unit comparable in size to housing units enclosing contemporary personal computer systems;

said housing unit contains a principal integrated circuit substrate on which said principal components are mounted;

said principal component sockets are adapted to receive integrated circuit cards containing said client computer devices; and said housing unit contains external connector openings allowing for delivery of electrical power to said principal components and said computer devices, and also allowing for attachment of said host processor and said client devices to device entities external to the respective network system enclosed within said housing unit.

12. The modular architecture in accordance with claim 7 characterized further in that:

said host processor and client computer cards are adapted to communicate via said system bus using a plurality of different signaling protocols, said protocols including a first protocol enabling said host processor to perform diagnostic functions relative to said client computer devices, a second protocol enabling said cards to individually control said bus as bus masters for accessing said storage resources via said bus and a third protocol enabling said client computer devices to communicate with each other and with said host processor as elements of a data communication network having address ports only on said bus.

13. The computer card in accordance with claim 9 having a connector subject to connection to a data communication network external to both said card and a multiprocessing system containing said card, wherein said card is further configured to operate as a data server between said external system and said multiprocessing system containing said card.

14. The modular computer system architecture in accordance with claim 13 wherein said system bus and computer cards are enclosed within a common housing and receive electrical power from a single common source.

15. A modular architecture for a spatially concentrated computer system, said system containing principal components including a host processor, storage resources managed by said host processor, a system bus coupled to said storage resources and plural sockets connected to said system bus for receiving removable cards containing client computer devices, said architecture being characterized in that:

said principal components and said removable cards are in a concentrated space such that the length of said system bus can be effectively minimized to allow said bus to transfer data at a very high rate;

said client computer devices are modular, allowing for a variety of different client devices to be plugged into each socket, and said client computer devices include self-contained programmable computer systems which require access to said storage resources via said bus during program execution;

said bus is operatable at a speed sufficient to enable each said client computer device to function efficiently while sharing access to said storage resources with said host processor and other said client devices for retrieving program information required by the respective client device to perform its functions; and said host processor and said client computer cards are adapted to communicate via said system bus using a plurality of different signaling protocols including a local area network (LAN) protocol in which data is transferred on said system bus in the form of packets accompanied by origin and destination address indications which specify system bus connection ports including said sockets.

16. The modular architecture as claimed in claim 15, wherein a further one of said plurality of different signaling protocols enables said host processor to perform diagnostic functions relative to said client computer devices.

17. The modular architecture as claimed in claim 15, wherein a further one of said plurality of different signaling protocols enables said cards to individually control said bus as bus masters for accessing said storage resources via said bus.

18. The modular architecture as claimed in claim 16, wherein a further one of said plurality of different signaling protocols enables said cards to individually control said bus as bus masters for accessing said storage resources via said bus.

19. The modular architecture in accordance with claim 15 wherein said system bus is a PCI bus.

20. The modular architecture in accordance with claim 15 wherein said host processor is connected to said system bus when communicating in said LAN protocol by a simulated pseudo-port connection constituting one of said connection ports that is specifiable by said address indications, and wherein said pseudo-port is accessed by said host processor using a program emulation to isolate other software running on said bus.

21. The modular computer system architecture in accordance with claim 15 wherein at least one of said addresses is an IP address.

22. The modular computer system architecture in accordance with claim 15 wherein at least one of said address is a MAC address.

23. The modular computer system architecture in accordance with claim 15 wherein:

said concentrated space is contained within a housing comparable in size to a contemporary personal computer housing;

said housing contains a principal integrated circuit substrate on which said principal components are mounted;

said principal component sockets are adapted to receive integrated circuit cards containing said client computer devices; and said housing has external connector openings allowing for delivery of electrical power to said principal components and said computer devices, and also allowing for attachment of said host processor and said client devices to computer devices external to said housing.

* * * * *